(12) United States Patent
Gagnon et al.

(10) Patent No.: US 12,492,383 B2
(45) Date of Patent: Dec. 9, 2025

(54) METHOD FOR DEPLETION OR REMOVAL OF ENDOTOXIN FROM AN ENDOTOXIN-CONTAINING SOURCE OR POTENTIALLY ENDOTOXIN-CONTAINING SOURCE

(71) Applicant: Sartorius BIA Separations d.o.o., Ajdovscina (SI)

(72) Inventors: Peter Stanley Gagnon, Las Vegas, NV (US); Lucija Rebula, Ajdovscina (SI)

(73) Assignee: Sartorius BIA Separations d.o.o., Ajdovscina (SI)

( * ) Notice: Subject to any disclaimer, the term of this patent is extended or adjusted under 35 U.S.C. 154(b) by 793 days.

(21) Appl. No.: 17/312,756

(22) PCT Filed: Dec. 16, 2019

(86) PCT No.: PCT/EP2019/085401
§ 371 (c)(1),
(2) Date: Jun. 10, 2021

(87) PCT Pub. No.: WO2020/120801
PCT Pub. Date: Jun. 18, 2020

(65) Prior Publication Data
US 2022/0056421 A1 Feb. 24, 2022

(30) Foreign Application Priority Data
Dec. 14, 2018 (EP) .................................... 18212639

(51) Int. Cl.
*C07K 1/18* (2006.01)
*B01D 15/32* (2006.01)
(Continued)

(52) U.S. Cl.
CPC ............. *C12N 7/00* (2013.01); *B01D 15/327* (2013.01); *B01D 15/34* (2013.01); *B01D 15/363* (2013.01);
(Continued)

(58) Field of Classification Search
CPC ............ C12N 7/00; C12N 2795/10151; B01D 15/327; B01D 15/34; B01D 15/363;
(Continued)

(56) References Cited

U.S. PATENT DOCUMENTS 6,365,147 B1 * 4/2002 Luo .................... B01D 15/3828
210/691
2002/0197249 A1 12/2002 Brady et al.
(Continued)

FOREIGN PATENT DOCUMENTS

JP 2016-514101 A 5/2016
WO 02-083710 A1 10/2002
(Continued)

OTHER PUBLICATIONS

Mourao in Separation of human IgG fragments using copper, nickel, zinc, and cobalt chelated to CM-Asp-agarose by positive and negative chromatography. 2016 (Year: 2016).*
(Continued)

*Primary Examiner* — Rebecca M Fritchman
(74) *Attorney, Agent, or Firm* — Christensen, Fonder, Dardi PLLC; Diane E. Bennett; Peter S. Dardi (57) ABSTRACT

A method for depletion or removal of endotoxins from a known or suspected endotoxin-containing source by virtue of a solid phase extraction material in an essentially aqueous system comprising the steps of—providing a known or suspected endotoxin-containing source, —contacting the known or suspected endotoxin-containing source with a positively charged solid phase material having a surface on
(Continued)

which ferric iron is immobilised, wherein the solid phase extraction material has immobilised the ferric iron by (2-aminoethyl)amine (TREN) ligand—incubating the known or suspected endotoxin-containing source for a period of time sufficient to bind endotoxin to the porous solid phase material, —separating the solid phase material from the essentially aqueous system, —optionally isolating the essentially aqueous system freed or depleted from endotoxin.

15 Claims, 4 Drawing Sheets

(51) Int. Cl.
  B01D 15/34 (2006.01)
  B01D 15/36 (2006.01)
  C07K 1/20 (2006.01)
  C07K 1/22 (2006.01)
  C12N 7/00 (2006.01)

(52) U.S. Cl.
  CPC .................. C07K 1/18 (2013.01); C07K 1/20 (2013.01); *C12N 2795/10151* (2013.01)

(58) Field of Classification Search
  CPC ... C07K 1/18; C07K 1/20; C07K 1/22; C07K 1/36; C12Q 1/24
  See application file for complete search history.

(56) References Cited

U.S. PATENT DOCUMENTS

| 2006/0030007 A1* | 2/2006 | Byrd | C12N 9/22 |
|---|---|---|---|
| | | | 435/69.7 |
| 2006/0079671 A1 | 4/2006 | Tchaga et al. | |
| 2010/0004218 A1* | 1/2010 | Whiteford | C07D 487/08 |
| | | | 540/472 |

FOREIGN PATENT DOCUMENTS

| WO | 03-097112 A1 | 11/2003 |
|---|---|---|
| WO | 2008-050148 A2 | 5/2008 |
| WO | 2013-180648 A1 | 12/2013 |
| WO | 2014-129964 A2 | 8/2014 |
| WO | 2014-129973 A1 | 8/2014 |
| WO | 2014-195387 A1 | 12/2014 |

OTHER PUBLICATIONS

Silva in Separation of human Fab fragments on negative mode Ni(II)-TREN agarose chromatography. 2014. (Year: 2014).*
Cheung in Immobilized metal ion chromatography: a review on its applications. 2012. (Year: 2012).*
Blowers, "Immobilized Metal Ion Chromatography", Handbook of Methods and Instrumentation in Separation Science, Elsevier Ltd., p. 334-337, (Jan. 1, 2009).
Szermer-Olearnik et al., "Removal of Endotoxins from Bacteriophage Preparations by Extraction with Organic Solvents", PLOS ONE, vol. 10 No. 3, p. 1-10, (Mar. 26, 2015).
Tan et al., "Differential Interactions of Plasmid DNA, RNA and Endotoxin with Immobilised and Free Metal Ions", Journal of Chromatography A, vol. 114 No. 2, p. 226-234, (Jan. 17, 2007).
International Search Report for corresponding European Patent Application No. PCT/EP2019/085401 dated Mar. 20, 2020.
Office Action from corresponding Japanese Patent Application No. 2021-555890 dated Nov. 28, 2023.
Third Party Observation from corresponding European Patent Application No. 19817377.5 dated Mar. 13, 2024.

* cited by examiner

Fig. 5 ical products [1,2].
METHOD FOR DEPLETION OR REMOVAL OF ENDOTOXIN FROM AN ENDOTOXIN-CONTAINING SOURCE OR POTENTIALLY ENDOTOXIN-CONTAINING SOURCE

CROSS REFERENCE TO RELATED APPLICATIONS

This application is a National Stage filing of PCT Application No. PCT/EP2019/085401 filed Dec. 16, 2019, entitled "A Method For Depletion Or Removal Of Endotoxin From An Endotoxin-Containing Source Or Potentially Endotoxin-Containing Source", which claims priority to European Patent Application No. 18212639.1, filed Dec. 14, 2018, both of which are incorporated herein by reference.

The present invention pertains to a method for depletion or removal of endotoxin from an endotoxin-containing source and various fields in which the method of the invention can be employed, as well as a fraction obtainable by the process of the invention.

BACKGROUND OF THE INVENTION

Lipopolysaccahrides (LPS) are cell wall constituents of Gram-negative bacteria. When such bacteria die and degrade, LPS, also known as endotoxins, are shed into the surrounding environment. Endotoxins are stable and persist for long periods of time even under harsh conditions. Endotoxins are a concern for the biopharmaceutical industry because they are very toxic. Even amounts as low as a few parts per million can cause a fever response. Larger doses can result in organ failure and death.

Potential sources of endotoxins in the field of bioprocessing include the following:
- Some products are grown in Gram-negative bacteria. Therefore, they are massively contaminated with endotoxins.
- Cell cultures for producing biopharmaceuticals, protein solutions, buffers and other process solutions can become contaminated (infected) by Gram-negative bacteria that shed endotoxins into the solution.
- Even in cases where no living Gram-negative bacteria are present or have been recently present, endotoxins can be present. For example, dry chemical components used to formulate process solutions can be contaminated with endotoxins.
- Process solutions can also become contaminated by casual contact with contaminated sources due to inadequate process hygiene. Again, actual infection with living bacteria is not required. Sources of endotoxins are far more diverse and widely distributed than sources of living bacteria.

Regulatory authorities worldwide are aware of the potential for endotoxin contamination to produce serious adverse consequences for persons receiving therapy and they have accordingly set stringent limits for allowable endotoxin levels. For example, recent publications have stated that the U.S. Food and Drug administration in particular is often not satisfied with the adequacy of manufacturing methods to adequately control endotoxin levels in finished biopharmaceutical products [1,2].

This puts pressure on manufacturers in the field of biopharmaceutical industry to design processes that effectively remove endotoxins. More effective processes require more effective tools.

Diverse solutions are presently available to reduce endotoxin levels in biopharmaceutical products. One of the oldest and most widely relied-upon methods is anion exchange chromatography. Anion exchangers have a positive charge and they bind biomolecules dominantly through charge interactions. Specifically, biomolecules with adequate negative charge bind to the positive charges on the anion exchanger. Endotoxins are negatively charged and bind strongly to anion exchangers. Most often, endotoxins bind anion exchangers more strongly than the biopharmaceutical products of interest. This makes it possible to selectively elute the product of interest, largely free of endotoxin. Endotoxin removal performance by quaternary anion exchangers (Q, QA, QAE, TMAE) is the baseline against which other endotoxin removal methods are compared [3-7].

There are many variations of anion exchange chromatography that also work, including so-called multimodal or mixed-mode chromatography media. The term multimodal means that they exploit more than one chemical mechanism to bind biomolecules, such as combinations of positive and negative charges, aromatic and aliphatic hydrophobic groups, hydrogen donors and hydrogen acceptors, among others. Virtually all of the multimodal media used to bind endotoxins are positively charged [3-5]. Examples include immobilized amino acids such as histidine or histamine. In other cases, synthetic chemical structures combine at least one positive charge with at least one hydrophobic residue. In some cases, combinations of positively charged and hydrophobic residues are further combined with residues that media hydrogen bonding. In other cases, complex biological proteins with high affinity for endotoxins are immobilized on chromatography surfaces to selectively trap endotoxins. However, these ligands are still dominated by the effects of their positive charge and their hydrophobicity [8].

Metal affinity chromatography represents another class of tools for endotoxin removal. The use of iron or calcium immobilized on the chelating ligand iminodiacetic acid (IDA) for endotoxin removal is known [9,10]. However, the method has practical shortcomings. IDA has a net charge of 2-. Calcium has a net charge of 2+ and iron 2+ or 3+. This leaves the ligand:metal complex with a net charge of either 0 or a weak +1. The practical outcome is that many proteins and other biologics fail to bind. They become diluted by the treatment and require a follow-on method to concentrate them. Another shortcoming is that many non-endotoxin contaminants also fail to bind and remain with the product of interest in the unbound fraction. This is important since therapeutic applications of require that host proteins be reduced to very low levels along with endotoxins. The practical outcome is that additional purification steps are required.

OBJECT OF THE INVENTION

An object of the invention is to provide an improved method for depletion or removal of endotoxin in endotoxin-containing sources or potentially endotoxin-containing sources. Another object of the invention is to provide for a commercially applicable method for depletion or removal of endotoxins which is useful in the pharmaceutical or food industry. Still another object of the present invention is to provide products having lower endotoxin contents than previously produced products, which products are obtainable by processes having process steps which are at risk to contaminate the products with endotoxin.

SUMMARY OF THE INVENTION

The objects of the present invention are accomplished by a method for depletion or removal of endotoxin from an endotoxin-containing source by virtue of a solid phase material extraction in an essentially aqueous system comprising the steps of provi­ding a known or suspected endotoxin-containing source, contacting the known or suspected endotoxin-containing source with a positively charged solid phase material having a surface on which ferric iron is immobilised, wherein the solid phase extraction material has immobilised the ferric iron by (2-aminoethyl)amine (TREN) ligand.

incubating the known or suspected endotoxin-containing source for a period of time sufficient to bind endotoxin to the porous solid phase material, separating the solid phase material from the aqueous system optionally isolating the aqueous system freed or depleted from endotoxin.

The method uses a solid phase comprising immobilized ligand TREN loaded with $Fe^{3+}$.

The term "endotoxin" includes compounds from Gram-negative bacteria which are known under the term lipopolysaccharide (LPS). According to one embodiment of the invention, the endotoxin is understood as endotoxin or a fragment of endotoxin which is pathogenic. The terms lipopolysaccharide, endotoxin or endotoxin fragment can be used interchangeably.

The term "endotoxin-containing" source means any source which is or which may be contaminated by the endotoxin, or endotoxin fragment. The source can be an essentially aqueous solution or dispersion which is suitable for a solid-phase extraction. Typically, but not limiting, the endotoxin-containing source or potentially endotoxin-containing source may be a naturally occurring biological fluid containing at least one component of interest that is or may be contaminated with endotoxin, for example a fermentation broth or a medium which has been employed in recombinant production processes.

The term "solid phase extraction material having a surface on which ferric iron is immobilised" describes a solid-phase extraction material which uses a solid-phase comprising ferric iron bonded by chelation as the primary mechanism. The term "ferric ion immobilized by (2-aminoethyl)amine (TREN)" describes a solid-phase comprising ferric iron bonded by chelation as the primary mechanism and which uses the positive charge of the ferric ion binding ligand as a secondary enhancing mechanism.

The term "solid-phase extraction" means in particular a sample preparation process by which compounds that are dissolved or suspended in a liquid mixture are separated from other compounds in the mixture according to their physical and chemical properties. Solid phase extraction can be used to isolate analytes of interest from a wide variety of matrices, including urine, blood, cell culture, water, beverages, soil, and animal tissue. Solid phase extraction uses in general the affinity of solutes dissolved or suspended in a liquid (known as the mobile phase) for a solid to which the sample is passed (known as the stationary phase) to separate a mixture into desired and undesired components. The result is that either the desired compounds of interest or undesired impurities in the sample are retained on the stationary phase. The portion that passes through the stationary phase is collected or discarded, depending on whether it contains the desired compounds or undesired impurities. If the portion retained on the stationary phase includes the desired compounds, they can then be removed from the stationary phase for collection in an additional step, in which the stationary phase is rinsed with an appropriate eluent.

The term "optionally isolating the concentrated product from the essentially aqueous system freed or depleted from endotoxin, host cell protein, and host cell DNA" refers to a step in which the product concentrated on the surface of the solid phase is selectively released by increasing the concentration of a salt to disrupt its interaction with the positive charge of the ligand while endotoxins and DNA remain bound by their affinity for the chelated ferric iron.

The term "suspected endotoxin-containing source" means a source for which it is not yet known if it contains endotoxin, but is at risk of containing endotoxin.

According to the present invention the endotoxin interacts by chelation with ferric iron which is immobilized on the surface (stationary phase) of the solid phase material. Consequently, the mobile phase flowing through solid phase extraction material is depleted or freed of the endotoxin. Also according to the present invention, the negatively charged endotoxin interacts with the surface of the solid phase because the surface is positively charged by virtue of being covalently coated with the electropositive chelating ligand tris(2-aminoethyl)amine, also known as TREN. Cooperativity between these two modes of interaction is understood to be the foundation for the extended utility of the present invention.

According to the invention, the surface of the solid phase material having TREN-$Fe^{3+}$ is positively charged, preferably by at least +1 or +2 or +3 per ligand.

"Chelation" refers to the stable chemical entrapment of metal ions. It involves the formation or presence of two or more separate coordination bonds between a poly-dentate chelating ligand and a single central metal atom. Usually these ligands are organic compounds and are called chelants, chelators, chelating agents, or sequestering agents. In most cases, the force of chelation is many times stronger, for example 15 to 60 times stronger than simple ionic interactions and enables the metal ion to remain entrapped by the chelating ligand even over a wide range of pH values and in the presence of high concentrations of salts.

According to the invention, the solid phase material has immobilised the ferric iron by means of a positively charged chelating ligand tris(2-aminoethyl)amine (TREN).

According to one embodiment of the invention, the inherent electropositive charge of the chelating ligand TREN is an important contributor to improved performance of the invention compared with metals immobilized on negatively charged chelating ligands. It will be understood that the exclusively positive charge of TREN will have an affinity for negatively charged endotoxins even independent from the affinity mediated by a chelated ferric ion. Positively charged anion exchange chromatography media that are understood to work only through charge interactions are known to have such an interaction with endotoxins. It will be equally understood that the electropositivity of the TREN will endow it with a strong affinity for contaminating DNA and RNA that might reside in a sample. In the absence of metal affinity, negatively charged ligands tend to repel negatively charged biomolecules such as endotoxins, DNA, and RNA. A further practical and important benefit of positively charged TREN over negatively charged chelating ligands, such as IDA and NTA is that the majority of biological products from which it might be desired to remove endotoxins are bound by electrostatic interactions and can thereby be concentrated from dilute source feed streams. The original description of ferric ions immobilized on negatively charge chelating ligands show that most products fail to bind, which ultimately causes those products to be diluted in comparison to the samples applied to them [9,10].

In one embodiment, an endotoxin-contaminated product is contacted with a solid phase surface comprising negatively charged chelating ligands loaded with iron (such as IDA-Fe or NTA-Fe). This reduces endotoxin content of the liquid phase containing the product of interest. The liquid phase is then contacted with a positively charged chelating solid phase, such as TREN-Fe, which has the effect of concentrating the product of interest from its dilute state following the previous step. Selective elution of the product from the TREN-Fe leaves the endotoxins still bound. It will be recognized that this approach may be useful in cases where a desired product is massively contaminated with endotoxins; to such an extent that no single method can achieve the desired low endotoxin levels in a single run.

According to another embodiment of the invention the solid phase material may have immobilised the ferric iron by means of a more positively charged chelating ligand, diethylene triamine, tri-ethylene tetraamine, tetraethyl pentaamine, N'-[5-(Acetyl-hydroxy-amino)pentyl]-N-[5-[3-(5-aminopentyl-hydroxy-carbamoyl) propanoylaminopentyl]-N-hydroxy-butane diamide (deferoxamine), 3-hydroxy-1,2-dimethylpyridin-4(1H)-one (deferiprone), 4-[(3Z,5E)-3,5-bis(6-oxo-1-cyclohexa-2,4-dienylidene)-1,2,4-triazolidin-1-yl]benzoic acid (deferasirox), coupled to a surface of the solid phase material. These ligands are positively charged.

According to a further embodiment of the invention the solid phase material may comprise a chromatographic material which depletes or removes the endotoxin by ferric iron chelation and/or complementary electrostatic interaction from the known or suspected endotoxin-containing source.

According to embodiments of the invention the solid-phase extraction is in particular a method selected from the group consisting of chromatography, filtration on chromatographic materials, co-precipitation and combinations thereof. Co-precipitation can include a situation where particles of the positively charged solid-phase extraction material comprising ferric iron are added to a endotoxin containing source or potentially endotoxin containing source. The positively charged solid-phase extraction material comprising ferric iron bind the endotoxin, the particles co-precipitated with the endotoxin can then be filtered out, or settled out, including settled out with the aid of centrifugation, or ultrasonic precipitation.

According to the invention the term "chromatographic material" includes any solid phase the surface of which has been chemically modified for the purpose of adsorbing biomolecules. This includes porous particles, including porous chromatography particles, non-porous particles, including non-porous chromatography particles, membranes including porous and non-porous membranes, macroreticulate (3-dimensional skeletal) materials including but not limited to monoliths and hydrogels, individual fibers packed amorphously in columns or woven materials including sheets, rolled sheets, pleated sheets, or other solid phase materials in physical configurations through which fluid may be flowed and thereby contacted with the endotoxin-containing or potentially endotoxin containing aqueous solution.

In still another embodiment of the invention the solid-phase extraction material advantageously removes a virus load from the endotoxin containing source or potentially endotoxin containing source.

In some embodiments, monolithic chromatography formats will be especially advantageous because of their low internal dispersion, their lack of turbulent shear forces, and their high capacity for large solutes such as endotoxins, DNA, and viruses. Their higher capacity for large solutes relative to other chromatography formats is especially important since endotoxins are known to exist in very large aggregations. Higher capacity translates to higher confidence that the capacity will not be a limiting factor in endotoxin removal efficiency. It also increases the utility of monoliths when the desired product itself is large, such as a virus, particularly including a bacteriophage, since high capacity will be required for both the bacteriophage and endotoxin.

In another embodiment of the present invention the pH value may be adjusted by physiologically acceptable acids or bases and/or the ionic strength is adjusted by physiologically acceptable buffer salts. The physiologically acceptable buffer salts can be selected from the group consisting of salts of acetates, citrates, phosphates, TRIS (tris-hydroxyaminomethane), imidazole, histidine, histamine, triethylamine, and zwitterionic salts (simultaneously positively and negatively charged) buffer ingredients such as HEPES (hydroxyethylpiperazine ethane sulfonic acid) and MES (morpholinoethanesulfonic acid) among others.

In most embodiments, the recommended operating pH for employing the method of the invention can be within the range of pH 7.0±1.5, or pH 7.0±1.0, or pH 7.0±0.5. pH ranges can be extended if necessary, for example to pH 7.0±2.0 or wider if necessary if the product of interest is known to tolerate those ranges. The ability of the method to remove endotoxins and nucleic acids will persist within these ranges.

In most embodiments the conditions for equilibrating the TREN-Fe3+ solid phase will be near physiological. This includes pH in the range of 7.0±0.5 and a sodium chloride or potassium chloride concentration of about 150 mM±100 mM. Salt concentrations may be lower if desired, such as in the range of 0 mM to 50 mM, or 0 mM to 25 mM, or 0 mM to 10 mM, or 0 mM to 5 mM. The ability of the method to remove endotoxins and nucleic acids will persist within these ranges.

It may be desirable in some embodiments to employ a higher concentration of salt during equilibration, such as 250 mM to 1000 mM, or 250 mM to 750 mM, or 250 mM to 500 mM. The ability of the method to remove endotoxins and nucleic acids will persist within these ranges.

Elution of the biological product of interest should be attempted first with salts that little or no known tendency to interact strongly with metals, such as halide salts or acetate salts. Such salts will minimize interference with the interaction between the immobilized Fe3+ ions and the phosphatidic acid residues of endotoxins and nucleic acids. For example, elution may be evaluated first with a gradient up to 2.0 M NaCl, or up to 3.0 M NaCl, or up to 4.0 M NaCl.

Elution of the biologic product of interest may be alternatively achieved by application of phosphate salts, including sodium phosphate, and potassium phosphate salts, in a single step, or multiple steps with increasing increments of phosphate concentration, or in a linear gradient over a specified range. For example, elution may be conducted in a single step to 500 mM phosphate; or by increasing phosphate concentration in increments of 100 mM, or 50 mM, or less, or more, up to a final concentration of 500 mM phosphate; or by a linear gradient from 0 mM to 500 mM phosphate. As a general matter, the lowest concentration that elutes the biological product of interest will provide the most effective reduction of endotoxin and nucleic acids. It will seldom be necessary to exceed 500 mM phosphate but higher increments may be evaluated if necessary. Where the phosphate concentration is intended to exceed 500 mM, potassium phosphate will be preferred over sodium phosphate because the solubility of sodium phosphate is limited at high concentrations. Citrate salts may be substituted for phosphates but endotoxin removal may be compromised. Elution can be achieved with chelating agents such as EDTA (ethylenediaminetetraacetic acid) but with high risk of compromising the ability of the method to remove endotoxins.

Another embodiment of the present invention employs the method of the invention for virus removal in virus containing sources, for the preparation of low-endotoxin bacteriophages containing compositions, for the purification of recombinantly produced proteins, in particular for therapeutic applications; for removal of endotoxins and/or viruses from cell culture ingredients to be used in preparation of recombinantly produced proteins, and for removal of endotoxins from in vitro diagnostic assay reagents where endotoxins might interact with sample components in a way that interferes with the ability of the assay to produce a precise and accurate result.

The subject matter of the present invention is also a fraction comprising an essentially aqueous system freed or depleted from endotoxin obtainable by the process according to the invention, having an endotoxin concentration of in particular less than 1 EU per $10^9$ infective bacteriophage particles (1 EU per billion phage particles).

In some embodiments, the concentration of endotoxin units in a sample may be determined by some form of assay based on the Limulus Amoebocyte Lysate assay. In brief, Limulus is the genus name of the Horseshoe crab. Their blood contains cells called amoebocytes. When the amoebocytes are lysed and exposed to endotoxins, a clot is produced. Such assays are produced in a wide variety of physical formats that allow simple, accurate, and reproducible endotoxin quantitation. Such assays are well known in the art, and many automated analytical systems are available to perform such testing on a routine reproducible basis. One example includes the EndoSafe system produced by Charles River Laboratories. The complete analytical method is described at www.criver.com/sites/default/files/resources/Endosafe®nexgen-PTS™AssayGuide.pdf. In order to enable comparisons among different preparations it is useful and sometimes necessary to express them in terms of a fixed concentration of product or number of product units. In one such case, endotoxin contamination may be expressed, for example, as the number of endotoxin units (EU) per 1 million infective phages, or per 1 billion infective phages, or the number of endotoxin units per some other fixed standard number of infective phages. It will be understood that this approach to expressing endotoxin contamination eliminates unbalanced comparisons based on endotoxin units per unit volume (per mL for example) without accounting for the relative concentration of infective phage. In another such case, endotoxin contamination maybe be expressed as endotoxin units per milligram (mg) or gram (g) of product. In another such case, endotoxin contamination may be expressed as endotoxin units per dose.

In embodiments where it is desirable to express the amount of endotoxin relative to a fixed number of infective virus particles, such as bacteriophages, it will be necessary to estimate the number of such virus particles. Estimates of infectious virus particle numbers are commonly developed by a body of methods referred to as plaque assays. Plaque assays for bacteriophages are typically performed in petri dishes or in multiwell plates. They involve first creating a gel layer impregnated with a bacterial species which the particular bacteriophage species is known to infect. A dilute solution of bacteriophage is applied to the surface and allowed to soak into the first gel layer, then a second gel layer is added to prevent uncontrolled spreading of liquid on the surface. At any location where a bacteriophage exists in contact with a bacterial cell, it will infect that cell and eventually kill it, releasing thousands to millions of bacteriophages. These will infect more bacterial cells, eventually across a large enough area that it creates a visible plaque, an area that is visually distinct from the areas that are still populated by living bacterial cells. Several such experiments are performed at different concentrations of bacteriophage, to the point where it becomes possible to state with reasonable confidence that 1 plaque corresponds to one original infecting bacteriophage. This one original infecting bacteriophage is referred to as a plaque forming unit (pfu). The number of pfu per volumetric unit of the original sample, for example per milliliter (mL), is understood to represent the concentration of infective bacteriophages in that original sample. Knowing the number of pfu/mL makes it possible to express the relative concentration of endotoxin; for example 10 endotoxin units per million pfu, or 10 endotoxin units per million infective phages, or 10 EU/$10^6$ pfu.

Subject matter of the present invention is also a kit comprising at least one component for performing the method of the invention. In one embodiment of the kit of the invention it comprises at least one component which is at least one of the solid-phase extraction material of the invention, in particular in form of a particulate material or monolith or combinations thereof.

The kit of the invention may further comprise instructions to perform the method of the invention.

In a closely related embodiment, the kit might optionally include other monoliths with some ability to remove endotoxins, such as one or more of the following: a monolith coated with a negatively charged chelating agent, a monolith that is coated with a non-metal binding anion exchanger, and/or a monolith coated with hydroxyl groups for high-salt applications.

The kit of the present invention can be used as an endotoxin removal kit, containing an immobilized ferric ion solid phases TREN-Fe, in combination with a hydrogen bond solid phase (e.g. H-Bond ADC monolith). The kits can be used in the manufacturing of bacteriophages, but also in many other contexts as well, specifically including antibodies. Endotoxins are a problem for many product sectors of pharmaceutical industry, including biotechnology.

Another such kit, also phage-directed, could contain one or more immobilized ferric ion solid phases TREN-Fe in combination with a hydroxylated solid phase (like an OH monolith) where the hydroxylated solid phase is used to concentrate the bacteriophage and reduce contaminant loads such as proteins, nucleic acids, and endotoxins.

In another embodiment, a kit comprising at least one component for performing the method of the invention might include a TREN monolith, and further include a hydroxyl-coated monolith where the two monoliths are intended for purification of viruses, especially including bacteriophages with low endotoxin, low DNA, and low host protein contamination.

In another embodiment, a kit comprising at least one component for performing the method of the invention might include only a TREN monolith. In one such embodiment, the kit might be directed toward the particular application of removing endotoxins from antibodies. It might alternatively be used to remove endotoxins from bacteriophage preparations that have been partially purified by other means.

Another embodiment of the invention is a method for depletion or removal of pyrogen from a pyrogen-containing source by virtue of a solid phase material extraction in an essentially aqueous system comprising the steps of
- providing a known or suspected pyrogen-containing source,
- contacting the known or suspected pyrogen-containing source with a solid phase material having a surface on which ferric iron is immobilised,
- incubating the known or suspected pyrogen-containing source for a period of time sufficient to bind pyrogen to the porous solid phase material,
- separating the solid phase material from the essentially aqueous system,
- optionally isolating the essentially aqueous system freed or depleted from pyrogen.

DETAILED DESCRIPTION OF THE INVENTION

The present invention utilises the combined ability of ferric iron and the ability of electrostatic interactions to interact preferentially with endotoxin or endotoxin fragments. In the following, the invention is described in detail by employing the method of the invention for endotoxin removal from bacteriophages produced in *E. coli* cultures. In view of the teaching of the present invention a person skilled in the art can easily develop analogous methods for removing endotoxins or endotoxin fragments from any samples containing endotoxins our being under suspicion to contain endotoxins.

Bacteriophages for therapeutic and other commercial applications are produced by first culturing the bacteria they target. An appropriate cell culture medium is inoculated with the desired species of bacteria. When the bacterial cell density approaches its highest level, the bacteria are in turn inoculated with the specific species of bacteriophage that are desired to be purified. One or more such individual phage particles infect a bacterial cell. They inject their DNA into the bacterial cell and then hundreds-to-thousands or more individual bacteriophages are produced inside the bacterial cell. The bacterial cell breaks open and releases the phages which then infect more bacterial cells. At some point, virtually all of the bacterial cells have become infected and died, and large concentrations of bacteriophages now reside in the cell culture along with debris from the dead bacteria. The cell culture process is terminated, and the bacteriophages are harvested. More specifically, the bacterial debris are removed, for example by filtration or centrifugation, and the bacteriophage preparation is thus rendered to a state from which the bacteriophages can be purified from soluble contaminants such as proteins, DNA, endotoxins, and cell culture components.

The bacteriophage species of greatest interest are generally those that infect and kill the most dangerous species of bacteria. Such bacterial species particularly include so-called Gram-negative species, including *Escherichia* spp., *Salmonella* spp., *Pseudomonas* spp., *Neisseria* spp., *Legionella* spp., *Shigella* spp., and *Klebsiella* spp., among others.

In addition to their pathogenic potential, such species impose another burden. Their cell walls contain Lipopolysaccharides (LPS), also known as endotoxins. LPS are pathogenic even independently from their parent bacteria. In some cases, even fragments of LPS, such as the Lipid A region of the molecule, are pathogenic. High concentrations or LPS are released from dying bacteria into the cell culture. In order for bacteriophages to be employed safely for human use, the endotoxins must be removed to extremely low levels. Endotoxin levels in bacteriophage harvests may commonly exceed 50,000 endotoxin units per millilitre (EU/mL) and must often be reduced to 10 EU/mL or less to be rendered safe for human use.

Bacteriophages produced by non-Gram-negative bacterial species such as *Staphylococcus* spp. or *Streptococcus* spp., among others, may also be contaminated with endotoxins from various sources. Even though generally contaminated at much lower levels, they may benefit substantially by treatment with the invention.

The core method of the invention involves a solid phase, the surface of which has been chemically modified to include a chelating agent, particularly a chelating agent with the ability to chelate ferric ions ($Fe^{3+}$), namely positively charged iron-chelating agents such as tris(2-aminoethyl) amine (TREN) among many others. The positively charged chelating solid phase is exposed to a solution of ferric ions, such as 100 mM ferric chloride in water, to charge the chelating groups, leaving the surface of the solid phase coated with chelated ferric iron.

Without being bound to any theory, the chelated ferric ions are believed to have a strong preferential affinity for the phosphate-associated oxygen atoms of the Lipid A and core polysaccharide regions of the LPS (endotoxin) molecule. Amino and amide nitrogen atoms, if present in those regions, are also understood to contribute to iron affinity. The positively charged chelating ligand is understood to endow the surface of the solid phase with a positive charged, which is known to have a strong electrostatic affinity for endotoxin, and which acts cooperatively with the metal affinity of iron for endotoxin. When a solution containing endotoxins is exposed to the chelated ferric ions on the surface of the solid phase, the endotoxins bind. The binding is sufficiently strong that it survives a wide range of salt concentrations and pH values. Bacteriophages, however, bind the chelated ferric iron weakly or not at all. In the absence of the positively charged ligand this causes them to flow past the surface of the solid phase. The positive charge of the solid phase endowed by the electropositive chelating ligand causes the bacteriophages to bind, which has the beneficial effect of concentrating them from a dilute feed stream. The method does not require that the solid phase be in a column format. Any physical format of solid that allows endotoxin to come into direct contact with a chelated ferric solid phase will achieve the desired result.

According to the invention, the surface of the solid phase material having TREN-$Fe^{3+}$ is positively charged, preferably by at least +1 or +2 or +3 per ligand.

The positive charge of the chelating agent is also understood to increase the affinity of the solid phase for endotoxins since the negatively charged phosphate-associated oxygen atoms of the lipid A and core polysaccharide regions will experience strong electrostatic attraction to positive charge on the chelating ligand.

In many embodiments of the method of the invention, contaminating nucleic acids, including DNA and RNA, will be reduced or removed coincident with reduction or removal of endotoxins. It will be understood that their strong binding to the solid phase will be mediated both by the affinity of their phosphate groups for the immobilized iron and because of their electrostatic affinity for the positively charged solid phase.

Experimental data indicate for all embodiments that the immobilized ferric ion is the factor that enables very-strong binding of endotoxins and further enables their separation from weaker-binding bacteriophages. Endotoxin binding appears to be uniformly strong for all endotoxins. The relative weakness of bacteriophage binding to chelated ferric ions on a solid phase may be explained by the observation that phages lack the phosphate residues that may promote strong binding of endotoxins. Aside from the lack of phosphate residues however, there is variation among bacteriophages with respect to their structure and chemistry. Many carry positive charges that mediate interactions with negatively charged solid phases. Many carry negative charges that mediate interactions with positively charged solid phases.

The chelator TREN has up to four positive charges. When it binds a ferric ion with three positive charges, its net charge hypothetically becomes +7.

The method is noteworthy most of all because of its exceptional ability to reduce endotoxin contamination but it is also noteworthy because it is extremely permissive with respect to operating conditions. This endows it with greater flexibility than alternative methods. For example, anion exchange chromatography requires that the salt concentration be kept low during sample application. High salt concentrations interfere with endotoxin binding and thus limit the utility of anion exchange chromatography processes. Salts for ion exchange should generally be monovalent, like sodium chloride, the individual ions of which have only a charge of 1− for Cl and 1+ for Na. Loading concentrations of NaCl should generally be kept below about 50 mM. The use of multivalent ions such as phosphate, with 2 or 3 negative charges depending on the pH, prevent effective endotoxin removal by ion exchangers even at very low concentrations, such as about 25 mM or less. Utilization of positively charged solid phases coated with chelated ferric ions in TREN permits endotoxin removal even at concentrations of NaCl from about 100 mM to about 1000 mM, and phosphate concentrations at least up to 500 mM. The operating pH range of the ferric ion method is also much broader than anion exchange, for example from about pH 3-8, versus anion exchange chromatography which requires an operating range of about pH 7-8.

The ability of chelated ferric ions on a positively charged surface to separate bacteriophages from endotoxins over a broad range of conditions is one of the surprising aspects of the invention and extends its utility by enabling it to be practiced in different formats. In some embodiments, the buffer conditions permit the bacteriophages to bind weakly to the solid phase. Accordingly, they accumulate on the surface of the solid phase. When they are later separated from the solid phase, they elute in a high concentration that can be advantageous, especially when the original source has a large volume containing phages at a low concentration.

Bacteriophages have no known affinity for the iron moieties on the surface of the solid phase. However, they have a strong electrostatic attraction for the positive charges on the immobilized chelating agent. This causes the bacteriophages to bind on the surface of solid phase along with the endotoxins. This has practical importance since it allows the bacteriophage to be concentrated quickly from large volumes of dilute samples. Since the bacteriophages have no significant affinity for the immobilized iron, they can be selectively eluted by a buffer that leaves the endotoxins strongly bound, thereby separating the bacteriophage from the endotoxin.

It will be understood that the negatively charged phosphate-associated oxygen atoms on nucleic acids such as DNA and RNA will also be strongly bound by the immobilized ferric ions. Likewise, their negative charge will enhance their affinity for the positively charged chelating agent. This illustrates the extended utility of a positively charged iron chelator such as TREN, since it enables enhanced removal of DNA and RNA along with endotoxins.

The unique utility of solid phases bearing a positively charged chelator in turn bearing immobilized ferric ions is extended even further by its ability to be eluted with salt gradients, since this enables more effective removal of host cell proteins. For contaminants that lack an affinity for iron, the surface of the solid phase is functionally equivalent to an anion exchanger and can be exploited as such.

Experimental data indicate for all embodiments that the immobilized ferric ion is a necessary factor for very-strong endotoxin binding.

In some embodiments, the conditions may be developed so that the bacteriophage binds to the chelated ferric ions on the solid phase. This may be accomplished by avoiding the presence of excess salts, especially including avoiding an excess of phosphate. Many phages will bind to TREN, which will serve the purpose of concentrating them. They may be recovered subsequently by increasing the conductivity of salt. Endotoxins will remain bound to the solid phase under conditions that enable recovery of the phage. This mode of chromatography is known in the art as Bind-elute Mode, where the product of interest is bound from a crude feed stream while some contaminants flow through, then the product of interest is later eluted in a concentrated form while another set of contaminants may yet remain bound. In this case, the contaminants that remain bound particularly include endotoxins, DNA, and RNA.

In some such embodiments, the buffer conditions used to equilibrated the sample and solid phase may be defined by having an absence of salts beyond the presence of the buffering compound, for example containing about 20 mM to about 50 mM acetate, or MES, or phosphate, or Tris, or other buffers while lacking additional salts such as sodium chloride, or potassium chloride, or sodium phosphate, or potassium phosphate, or ammonium sulfate, or sodium sulfate, or potassium sulfate. In other such embodiments, the concentration of salts beyond about 20 mM to about 50 mM concentration of buffering agent may be limited to any of the above or other salts at a concentration or less than about 50 mM, or a concentration of less than about 100 mM, or less than about 100 mM. In all the above cases, the intent will be to permit binding of the bacteriophages.

In some embodiments, the bacteriophage can be eluted in a single step of increasing salt concentration. In similar embodiments, a pre-elution step can be included that removes weak-binding contaminants before the bacteriophage is eluted with a yet higher concentration of salt. In some such embodiments, a third step may be applied where a yet higher concentration of salt removes contaminants from the solid phase that were bound more strongly than the phage. In some embodiments, in place of discrete steps of salt concentration, salt concentration may be changed gradually and continuously to perform a so-called linear gradient elution. In some embodiments, pH may also be altered to modulate the binding conditions and amounts of salt required to achieve elution of the bacteriophage. As a general matter, binding of bacteriophages and endotoxins will be stronger with decreasing pH, which means that binding will be more tolerant of salt at low pH values, but will may require more salt to elute the bacteriophage. Such relationships and how to manage them are well known in the art.

Despite the wide range of conditions and operating formats that may be embodied by the invention, it is important to recognize that the invention fulfils its purpose of removing or reducing the amounts of endotoxin in a bacteriophage preparation regardless of those variations. Variation of conditions within the specified ranges is not the determinant of whether the invention works. The ability of the invention to fulfil its claimed reduction or removal of endotoxins is defined by the presence of chelated ferric ions on the surface of the solid phase. This is important because it enables conditions to be used that favour high recovery of infective bacteriophages. This distinction is further important to appreciate because it contrasts with the requirements and capabilities of other endotoxin removal methods, for example anion exchange chromatography, which requires a very narrow range of pH and salt conditions. The ability of the present invention to achieve good results over a wide range of conditions highlights an important aspect of its utility.

In some embodiments it may be desirable to use the method of the invention to remove endotoxins from a biologic that does not bind well to the positively charged chelator-ferric ion complex. IgG antibodies represent one example. Most bind poorly to positively charged media because electrostatic repulsion created by their electropositive charge prevents effective binding. In such cases, the biological product will flow through the column during sample application while endotoxins and nucleic acids will be removed.

In some embodiments, the contact time required for the endotoxin to become bound will vary according to the type of solid phase to which the chelated ferric ions are bound. If the solid phase is in the form of a membrane, fibre, sheet, hydrogel or monolith used in a flow-through format, such as a chromatography device, the required contact time may be less than about 10 seconds, or less than about 5 seconds, or less than about 1 second. For practical purposes, it will generally not be possible to attain such low contact times because of instrument limitations including pump flow rate and/or pressure tolerances. If the solid phase consists of non-porous particles packed in a column, the required contact time may be less than about 10 second, or less than about 30 seconds, or less than about 1 minute, or less than about 2 minutes. If the solid phase consists of porous particles packed in a column, the required contact time may be about 2 minutes to about 5 minutes or more, and longer contact times such as about 10 minutes to about 20 minutes may support more effective endotoxin removal. If the solid phase consists of porous particles loosely distributed in an open container, the required contact time may exceed about 30 minutes, or may exceed about 60 minutes, or may exceed about 120 minutes, and may continue to benefit from further exposure such as continuing contact for about 4 hours, or about 8 hours, or about 16 hours. The parameter of contact time is well known in the art, as well as the different contact times that may be required with different materials or operating formats, and well within the ability of a person of ordinary skill to optimize without undue experimentation.

In some embodiments, endotoxin can be removed from the solid phase after use by treatment with about 1 M NaOH for at least about 60 minutes. Sodium chloride may be optionally included, in one example yielding a compound formulation of 1 M NaOH plus 2 M NaCl. The ferric coating may be regenerated, if necessary, by passing about 1 column volume of about 100 mM ferric chloride over it prior to its equilibration for the next processing cycle.

In all embodiments, optimization of endotoxin binding capacity and removal efficiency should be balanced with the need to conserve the ability of the bacteriophage to infect its bacterial target. In some such embodiments, one or more stabilizing compounds may be included in the buffers to aid conservation of viral infectivity. In one such embodiment, the buffers may contain about 10% glycerol as a stabilizer to conserve viral infectivity, or about 5% to about 15% glycerol, or about 2% to about 20% glycerol, or about 1% to about 25% glycerol, or a higher concentration of glycerol up to about 50%. It will be recognized that additives such as glycerol increase viscosity. This may disqualify some solid phase such as particles packed in columns because shear stress increases in direct proportion to viscosity. This limitation is suspended in monoliths since flow through the chromatography bed is laminar. This contributes to a conclusion that monoliths are the preferred physical format of the solid phase, especially where the inclusion of a viscosity-increasing additive such as glycerol may be required to stabilize the phage.

In some embodiments, the buffers may contain amino acids as stabilizers which are positively charged under physiological conditions. The buffers may in particular contain about 100 mM to about 700 mM arginine, or about 200 mM to about 600 mM arginine, or about 300 mM to about 500 mM arginine, or about 400 mM to about 500 mM arginine. In some such embodiments, the buffers may contain about 100 mM to 200 mM about histidine as a stabilizer, or about 50 mM to about 250 mM, or about 75 mM to about 150 mM, or about 25 mM to about 225 mM.

In other embodiments, the buffers may contain about 50 mM to about 250 mM sorbitol, xylose, or mannitol as a stabilizer, or about 100 mM to about 200 mM, or about 150 to about 200 mM sorbitol, xylose, or mannitol. In some embodiments, the buffers may contain about 1%-about 15% sucrose, or about 5% to about 10% sucrose. In some embodiments the buffers may contain about 50 mM to about 2.0 M glycine, taurine, or betaine as a stabilizer, or about 100 mM to about 1.0 M, or about 200 mM to about 800 mM, or about 400 mM to about 700 mM, or about 500 to about 600 mM.

In particular a monolithic solid phase will be used in the method of the invention. Monoliths support faster binding kinetics and higher capacity for endotoxins than other solid phase configurations. An explanation for this—although not bound by this theory—may be found in the molecular designs in particular the large size of endotoxins. Even pure endotoxins form large aggregates in the presence of metal ions and the absence of detergents, but endotoxins in bacterial cell cultures are not pure. They may be co-aggregated with a range of other components for example cell debris, including cell wall and cell membrane fragments, proteins, nucleic acids, lipids, and carbohydrates, among others. These heteroaggregates may in some cases exceed several hundred nm in size. This affects removal performance with porous particle chromatography media because some of these aggregates are too big to enter the pores where most of the binding substrate exists. Even those small enough to enter the pores still have slow diffusion constants that retard pore entry.

Any solid phase used to practice the invention may optionally be used once and then discarded, or it may be used multiple times.

A limitation of all solid phase methods for endotoxin removal concerns their capacity. Even an extremely effective removal method can be overwhelmed by a heavy excess of sample. For this reason, endotoxin removal, especially from high endotoxin sources like bacteriophage preparations, often includes a preliminary step to bring the endotoxin levels into a range where a final polishing method. Loading 10 million endotoxin units on a solid phase that has an expected capacity of 1 million endotoxin units will exceed its capacity and cause the treated preparation to remain contaminated with endotoxin.

In some embodiments, the capacity limitation of the chelated-ferric ion solid phase, if significant, may be suspended by prior treatment of the sample with an alternative method that reduces endotoxin content sufficiently to bring endotoxin content into a range where it can be further reduced by the method of the invention to meet requirements appropriate for human use of the purified bacteriophage.

The solid-phase extraction material for binding ferric iron on its surface is chemically modified with a positively charged chelating ligand, namely tris(2-aminoethyl)amine (TREN).

Alternatively, the positively charge iron-chelating ligand may be diethylene triamine, triethylene tetraamine, tetraethyl pentaamine, N'-[5-(Acetyl-hydroxy-amino)pentyl]-N-[5-[3-(5-aminopentyl-hydroxy-carbamoyl) propanoylaminopentyl]-N-hydroxy-butane diamide (deferoxamine), 3-hydroxy-1,2-dimethylpyridin-4(1H)-one (deferiprone), or 4-[(3Z,5E)-3,5-bis(6-oxo-1-cyclohexa-2,4-dienylidene)-1,2,4-triazolidin-1-yl]benzoic acid (deferasirox). A solid phase material bearing immobilized TREN ligands is available commercially under the name Bioworks Workbeads™ 40 TREN. It is not available commercially in the iron-loaded form necessary to perform the method of the invention. A variety of other solid phase materials may be synthesized on which TREN itself may be immobilized and the ferric ion subsequently captured by the TREN ligand, or by another positively charged iron-chelating ligand. Such solid phase materials potentially include but are not limited to monoliths, hydrogels, filters, fibers, loose particles, any of which can be provided in the form of ready-to-use chromatography devices In further embodiments, the method of the invention using ferric ions immobilized by positively charged TREN on a solid phase may be combined with an additional purification method to achieve a higher degree of purification, such as a higher degree of contaminating protein removal, a higher degree of contaminating DNA removal, and/or a higher degree of endotoxin removal. In some such embodiments, the method of the invention using ferric ions immobilized by positively charged TREN on a solid phase is combined may be a precipitation step, in which the product of interest is precipitated by the known techniques of salt precipitation, for example with ammonium sulfate or potassium phosphate, or PEG precipitation, for example with polyethylene glycol with a molecular weight of 4-10 kDa. In other such embodiments, the method of the invention using ferric ions immobilized by positively charged TREN on a solid phase is combined may be a chromatography method, such as ion exchange chromatography, or hydrophobic interaction chromatography, or hydrogen bond chromatography, or affinity chromatography, or steric exclusion chromatography, or some other chromatography method. In some such embodiments, the method of the invention using ferric ions immobilized by positively charged TREN on a solid phase is combined may be operated in a column format. In other such embodiments, the method of the invention using ferric ions immobilized by positively charged TREN on a solid phase is combined may be operated in a batch format. In some such embodiments, both the method of the invention using ferric ions immobilized by positively charged TREN on a solid phase and the additional purification method may be performed in a batch format.

In one embodiment where the method of the invention using ferric ions immobilized by positively charged TREN on a solid phase is combined with another chromatography method, the other chromatography method involves the use of a solid phase extraction material with hydroxyl (—OH) groups on its surface. In one such embodiment, this approach is employed toward the goal of purifying a virus, for example a lipid-enveloped virus, or a non-lipid-enveloped virus, or a bacteriophage. In one such embodiment, the hydroxylated solid phase extraction material may be combined with the virus in the presence of one or a combination of precipitating salts, such ammonium sulfate, potassium phosphate, sodium or potassium sulfate, or sodium or potassium citrate, among others, where the precipitating salt is present at a sufficient concentration to cause the virus to be forced out of solution and accumulate on the surface of the solid phase while smaller contaminants fail to accumulate and are thus eliminated. The virus is subsequently recovered by reducing the concentration of the precipitating salt, which causes the virus to elute. The elution fraction containing the virus may then be processed by the method of the invention using ferric ions immobilized by positively charged TREN on a solid phase.

The kit of the invention comprises in a suitable form at least one of the solid-phase extraction materials which can be used for performing the method of the invention. This is a particulate material or monolith or a combination thereof. the solid-phase extraction material can be arranged in a cartridge, column or be packed in a loose form. it can also be provided in form of a fibre and/or a fibrous material, or one or more membranes.

In one embodiment, the component for performing the method of the invention would be TREN monolith. In one such embodiment, the kit might optionally include other monoliths with some ability to remove endotoxins, such as one or more of the following: a monolith coated with a negatively charged chelating agent, a monolith that is coated with a non-metal binding anion exchanger, and/or a monolith coated with hydroxyl groups for high-salt applications.

In another embodiment, a kit comprising at least one component for performing the method of the invention might include a TREN monolith, and further include a hydroxyl-coated monolith where the two monoliths are intended for purification of viruses, especially including bacteriophages with low endotoxin, low DNA, and low host protein contamination.

In another embodiment the kit of the invention may additionally comprise at least one ingredient for the preparation of buffers to be used in the method the invention. Such ingredients can be substances for adjusting the ionic strength or the pH value of the solutions which are employed during performing the method of the invention. The kit of the invention can comprise materials for performing assays for measuring endotoxin contents or determination of the quality of the product to be isolated such as measuring the infectivity of the bacteriophage which becomes purified. The kit of the invention may further comprise instructions to perform the method of the invention.

The kit of the present invention can be used as an endotoxin removal kit, containing one or more immobilized ferric ion solid phases TREN-Fe in combination with a hydrogen bond solid phase (H-Bond ADC monolith). The kits can be used in the manufacturing of bacteriophages, but also in many other contexts as well, specifically including antibodies.

Another such kit, also phage-directed, could contain one or more immobilized ferric ion solid phases TREN-Fe in combination with a hydroxylated solid phase (like an OH monolith) where the hydroxylated solid phase is used to concentrate the bacteriophage and reduce contaminant loads such as proteins, nucleic acids, and endotoxins. The kit could also comprise one or more immobilized ferric ion solid phases.

All references cited herein are incorporated by reference to the full extent to which the incorporation is not inconsistent with the express teachings herein.

The invention is further explained by the following non-limiting examples.

Example 1

Preparation of an Experimental Control to Provide a Baseline to Document Relative Effectiveness of the Invention.

10 mL of clarified harvest of a *E. coli* cell culture containing bacteriophage T4 was partially purified by hydrophobic interaction chromatography (HIC). The bacteriophage elution peak from the HIC step was diluted with 50 mM Tris, 1 mM $CaCl_2$, 0.5 mM $MgCl_2$, 20 mM NaCl, 10% glycerol, pH 7.7 to a final conductivity of 7.42 mS/cm. A 100 µL CIMmac QA (strong anion exchange) monolith (BIA Separations) was equilibrated with 50 mM Tris, 1 mM $CaCl_2$), 0.5 mM $MgCl_2$, 20 mM NaCl, 10% glycerol, pH 7.7. The diluted bacteriophage was loaded onto the QA monolith. The monolith was washed with 60 bed volumes of equilibration buffer then eluted with a 50 bed volume (5 mL) linear gradient to 50 mM Tris, 1 mM $CaCl_2$), 0.5 mM $MgCl_2$, 2 M NaCl, 10% glycerol pH 7.7. The column was cleaned and sanitized with 1 M sodium hydroxide, 2 M sodium chloride. Fractions were collected throughout the run for subsequent analysis. The bacteriophage eluted in a single peak with a conductivity value of about 25 mS/cm (measured at peak center). 55% of the infective bacteriophage was eluted in main peak. Testing of that peak by Endosafe showed a concentration of 141 endotoxin units per milliter (EU/mL), corresponding to 11 EU per billion phages.

Example 2 (Comparative)

Figure 1:
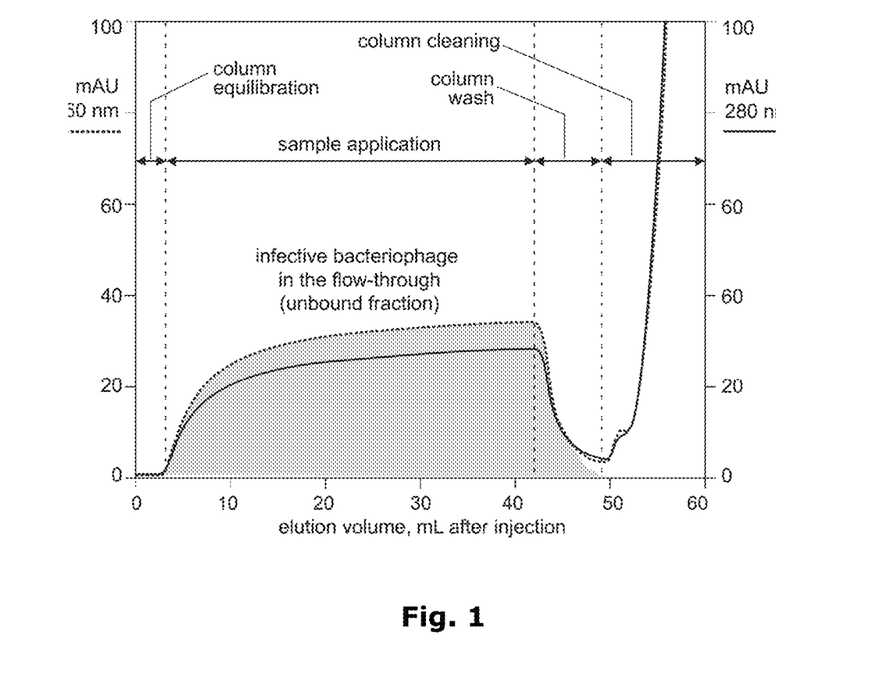
FIG. 1 shows a chromatogram according to example 2.

Experimental endotoxin reduction by an initial hydrophobic interaction chromatography (HIC) step followed by IDA-Fe (a negatively charged chelating ligand) (CIM IDA, BIA Separations). HIC was performed on a T4 bacteriophage harvest as described in example 1, but on larger scale with 160 mL of lysate loaded onto an 8 mL HIC monolith. The 31 mL elution fraction contained 138,167 EU/mL of endotoxin. This fraction was diluted 20 mM $KH_2PO_4$, 10% glycerol, pH 7.0 to a final conductivity of 6.7 mS/cm. A 340 µL IDA monolith was prepared by washing it with 20 CV deionized water; then 20 CV 100 mM acetic acid, pH 3.0; the 20 CV 200 mM Ferric chloride, then 20 CV 50 mM acetic acid, 2.0 M sodium chloride, pH 4.5; 20 CV of deionized water. The column was then equilibrated to 20 mM potassium phosphate, 10% glycerol, pH 7.0. Two (2) mL of the fraction from HIC was diluted with 40 mL of mobile phase A to conductivity 6.7 mS/cm. The sample was loaded onto the IDA monolith, then the column was washed with 20 CV of 20 mM potassium phosphate, 10% glycerol, pH 7.0 to displace any remaining unbound material. The column was eluted with a 20 CV linear gradient ending at 500 mM potassium phosphate, pH 7.0. Fractions were collected throughout the run for subsequent analysis. The chromatogram is illustrated in FIG. 1. One hundred percent of the infective bacteriophage was found in the flow-through fraction from the 0.0 mL mark to about 45 mL, representing about a 50% dilution from volume eluted from the HIC column. The endotoxin concentration was measured at 315 EU/mL, corresponding to 5.75 EU per billion phages.

Example 3

Experimental Documentation that Ferric Ions Immobilized on the Surface of an Experimental Monolithic Tris(2-Aminoethyl)Amine (TREN) Solid Phase Surface Produced by BIA Separations Achieve Superior Endotoxin Reduction Compared to a Strong Anion Exchanger (CIMmultus QA, BIA Separations).

Figure 2:
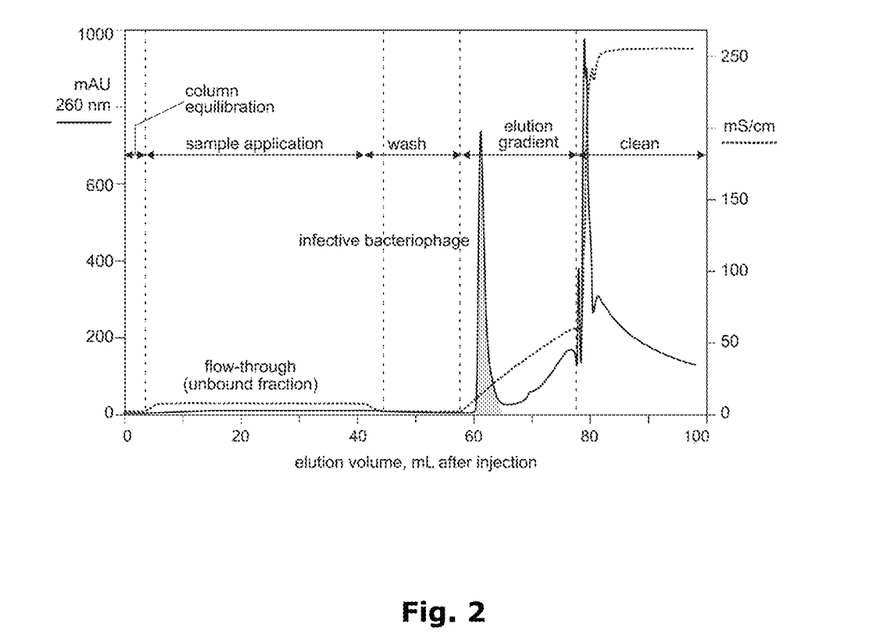
FIG. 2 shows a chromatogram according to example 3.

HIC was performed on a T4 bacteriophage harvest as described in example 2. Endotoxin testing showed that the bacteriophage fraction contained 138167 EU/mL of endotoxin. 2 mL of fraction from HIC was diluted with 40 mL of mobile phase A to final conductivity of 9.3 mS/cm. A 1 mL TREN monolith was prepared as described in example 2 by running reagents over it at a flow rate of 5 CV/min. The column was equilibrated with 20 mM potassium phosphate, pH 7.0. 40 mL of diluted sample was loaded, then the column was washed with 15 CV of 20 mM potassium phosphate, pH 7.0. The column was eluted with a 20 CV linear gradient ending at 500 mM potassium phosphate, pH 7.0. Fractions were collected throughout the run for subsequent analysis. The chromatogram is illustrated in FIG. 2. No infective bacteriophage was found in the column effluent corresponding to the column loading phase. 125% of the bacteriophage was found in the peak eluting at a conductivity of 16 mS/cm. Testing by LAL assay (Endosafe) showed a concentration of less than 10 endotoxin units per milliter (EU/mL) in the eluted peak. This is understood to represent a value close to but not exceeding 10 EU/mL, corresponding to less than 0.4 EU per billion phages; about 25 times better than achieved with the industry standard method using a strong anion exchanger.

Example 4 (Comparative)

Preparation of an Experimental Control to Provide a Comparative Example for the Method of the Invention.

Clarified harvest of an *E. coli* culture containing bacteriophage T4 was partially purified by ammonium sulfate precipitation. 1 mL of harvest was combined with 1.5 mL of 3 M ammonium sulfate, buffer 50 mM MES, pH 6.5. The mixture was centrifuged at 9000×g for 10 min and the supernatant was discarded. The precipitate was resuspended with 0.8 mL of 500 mM Potassium phosphate, pH 7.0.

Loose (unpacked) porous particles with iminodiacetic acid on their surfaces (Iminodiacetic acid Sepharose, Sigma-Aldrich) were prepared by washing them twice with 20 mL deionized water, centrifuging 100×g for 5 minutes, then discarding the supernatant; then washing by the same method with 20 mL 100 mM sodium acetate, pH 3.0; then treating them with 20 mL 200 mM ferric chloride; then washing them with 50 mM acetate, 2 M sodium chloride, pH 4.5; then washing with 20 mL deionized water. The particles were then equilibrated with 50 mM MES, pH 6.5. Experiments were performed with a 50% slurry of these particles.

0.2 mL of 50% slurry was added to 0.8 mL of the resuspended ammonium sulfate precipitate and incubated in 2-8° C. with mixing 3 times per day to bind endotoxins. The particles were sedimented by centrifugation and removed. The remaining liquid, containing the bacteriophage, contained 15.8 EU/mL endotoxins.

Example 5

Experimental Documentation that Ferric Ions Immobilized on the Surface of an Tris(2-Aminoethyl)Amine (TREN) Solid Phase Achieves Superior Endotoxin Reduction Independent the Purification Method it is Combined with and Independent of the Physical Form of the Solid Phase.

Clarified harvest of an *E. coli* culture containing bacteriophage T4 was partially purified by hydrophobic interaction chromatography (HIC). 1 mL of the elution fraction, containing 5876 EU was diluted 100× with 50 mM MES pH 6.0 was used for the next step. Loose (unpacked) porous particles with TREN on their surfaces (Workbeads TREN 40, BioWorks) were charged with ferric ions. One (1) mL of 50% slurried TREN particles was added to 0.25 mL of the diluted HIC fraction and incubated for 120 min with occasional mixing to bind endotoxins. The particles were sedimented by centrifugation and removed. The remaining liquid, containing the bacteriophage, contained 9.73 EU/mL endotoxins.

Example 6

Preparation of an Experimental Control to Provide a Baseline to Document Relative Effectiveness of the Invention. Initial Purification of Bacteriophage T4 by Preferential Exclusion Chromatography and Polishing by Anion Exchange Chromatography.

Figure 3:
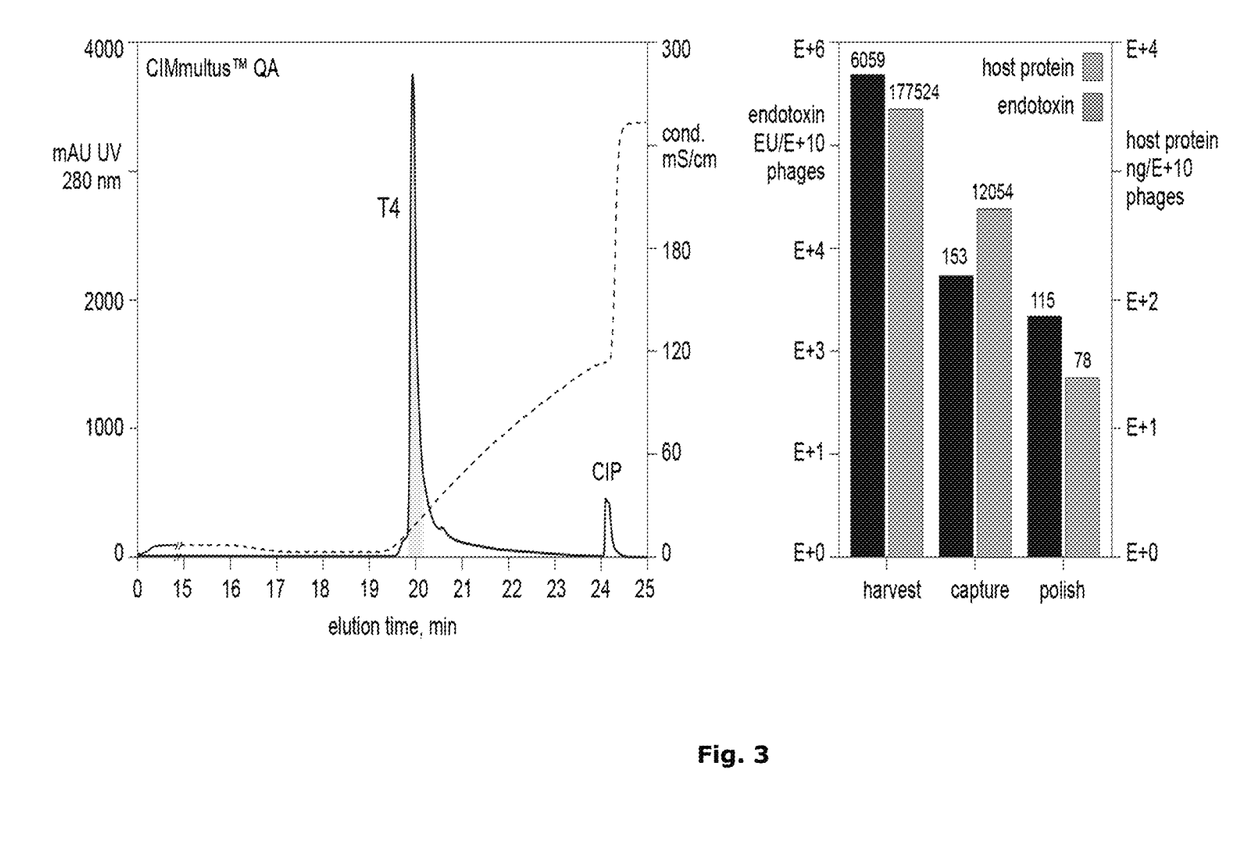
FIG. 3 shows a chromatogram according to example 6.

Anion exchange chromatography on strong anion exchangers is considered the industrial standard for endotoxin removal. 10 mL of clarified harvest of a *E. coli* cell culture containing bacteriophage T4 was partially purified by preferential exclusion chromatography on a 1 mL CIMmultus OH monolith. The bacteriophage elution peak was diluted with 50 mM Tris, 1 mM CaCl$_2$), 0.5 mM MgCl$_2$, 20 mM NaCl, 10% glycerol, pH 7.7 to a final conductivity of 7.42 mS/cm. A 100 µL CIMmac QA (strong anion exchange) monolith was equilibrated with 50 mM Tris, 1 mM CaCl$_2$), 0.5 mM MgCl$_2$, 20 mM NaCl, 10% glycerol, pH 7.7. The diluted bacteriophage was loaded onto the QA monolith. The monolith was washed with 60 bed volumes of equilibration buffer then eluted with a 50 bed volume (5 mL) linear gradient to 50 mM Tris, 1 mM CaCl$_2$), 0.5 mM MgCl$_2$, 2 M NaCl, 10% glycerol pH 7.7. The column was cleaned and sanitized with 1 M sodium hydroxide, 2 M sodium chloride. Fractions were collected throughout the run for subsequent analysis. Endotoxins were reduced from 177,524 EU per 1e+10 phages in the harvest, to 12054 EU per 1e+10 phages after the preferential exclusion step, to 78 EU per 1e+10 phages after anion exchange. Host protein was reduced from 6059 ng per 1e+10 phages in the harvest, to 153 ng per 1e+10 phages after the preferential exclusion step, to 115 ng per 1e+10 phages after anion exchange. Results are shown in FIG. 3.

Example 7

Initial Purification of Bacteriophage T4 by Preferential Exclusion Chromatography and Polishing by Hydrogen Bond Chromatography.

Figure 4:
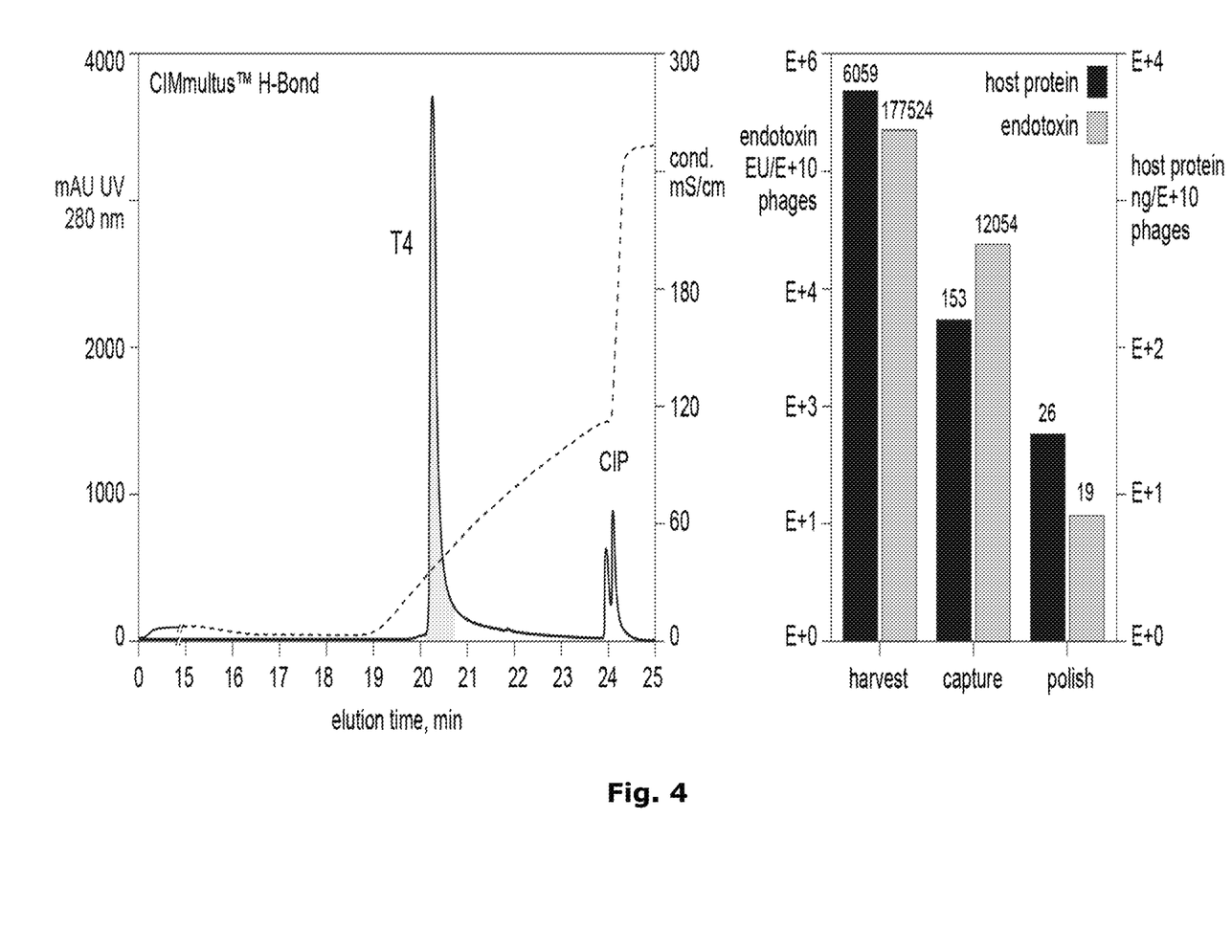
FIG. 4 shows a chromatogram according to example 7.

The hypothesis was tested that hydrogen bond chromatography might support more effective endotoxin removal than anion exchange and thereby provide a more competitive reference for the method of the invention. An aliquot of the eluted bacteriophage from the preferential exclusion chromatography step in example 6 was polished by hydrogen bond chromatography in place of anion exchange chromatography. A 100 µL CIMmac H-Bond monolith was equilibrated with 50 mM Tris, 1 mM CaCl$_2$), 0.5 mM MgCl$_2$, 20 mM NaCl, 10% glycerol, pH 7.7. The diluted bacteriophage was loaded onto the QA monolith. The monolith was washed with 60 bed volumes of equilibration buffer then eluted with a 50 bed volume (5 mL) linear gradient to 50 mM Tris, 1 mM CaCl$_2$), 0.5 mM MgCl$_2$, 2 M NaCl, 10% glycerol pH 7.7. The column was cleaned and sanitized with 1 M sodium hydroxide, 2 M sodium chloride. Fractions were collected throughout the run for subsequent analysis. Endotoxins were reduced from 177,524 EU per 1e+10 phages in the harvest, to 12054 EU per 1e+10 phages after the preferential exclusion step, to 19 EU per 1e+10 phages after hydrogen bond chromatography. Host protein was reduced from 6059 ng per 1e+10 phages in the harvest, to 153 ng per 1e+10 phages after the preferential exclusion step, to 26 ng per 1e+10 phages after hydrogen bond chromatography. Results are shown graphically in FIG. 4. Overall, endotoxin removal by hydrogen bond chromatography was roughly 4 times better than anion exchange while host cell protein removal was about 5 times better.

Example 8

Experimental Comparison of Purification Performance by the Method of the Invention Versus Anion Exchange Chromatography and Hydrogen Bond Chromatography.

Figure 5:
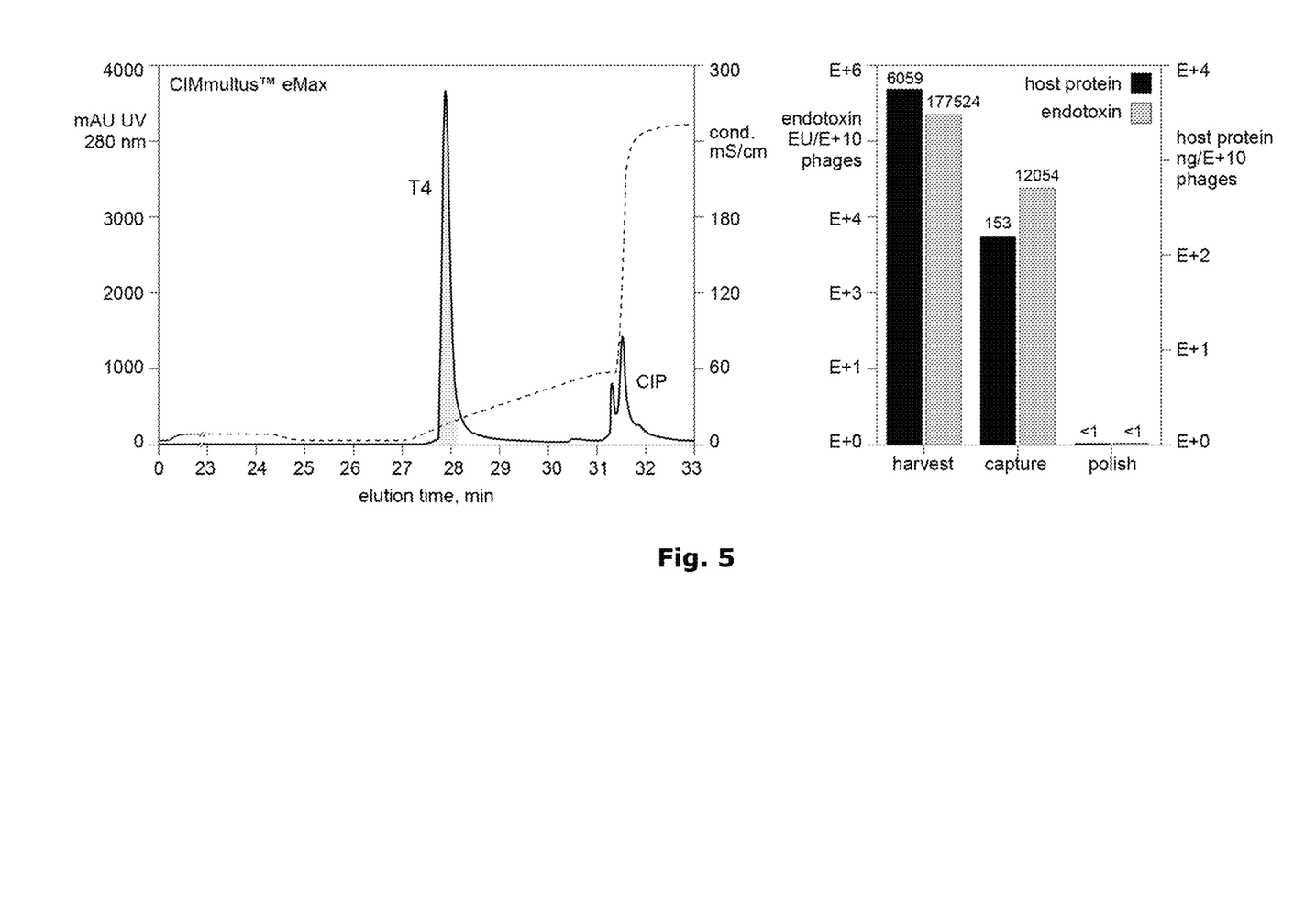
FIG. 5 shows a chromatogram according to example 8.

An aliquot of the eluted bacteriophage from the preferential exclusion chromatography step in example 6 was polished on a 100 µL TREN monolith. It was equilibrated with 20 mM potassium phosphate, pH 7.0. 40 mL of diluted sample was loaded, then the column was washed with 15 CV of 20 mM potassium phosphate, pH 7.0. The column was eluted with a 20 CV linear gradient ending at 500 mM potassium phosphate, pH 7.0. Fractions were collected throughout the run for subsequent analysis. Endotoxins were reduced from 177,524 EU per 1e+10 phages in the harvest, to 12054 EU per 1e+10 phages after the preferential exclusion step, to less than EU per 1e+10 phages (below the sensitivity of the assay) after the method of the invention. Host protein was reduced from 6059 ng per 1e+10 phages in the harvest, to 153 ng per 1e+10 phages after the preferential exclusion step, to less than 1 ng per 1e+10 phages (below the sensitivity of the assay) after the method of the invention. Results are shown graphically in FIG. 5. Overall, endotoxin removal by method of the invention was roughly 80 times better than anion exchange and 20 times better than hydrogen bond chromatography while host cell protein removal was about 100 times better than anion exchange and 25 times better than hydrogen bond chromatography.

REFERENCES

Lolas A. Microbial Control Strategies in Bioprocessing Falling Short of Assuring Product Quality and Satisfying Regulatory Expectations. American Pharm. Rev. (2013); www.americanpharmaceuticalreview.com/Featured-Articles/134040-Microbial-Control-Strategies-in-Bioprocessing-Falling-Short-of-Assuring-Product-Quality-and-Satisfying-Regulatory-Expectations.

2. Suvarna K, et al. Case Studies of Microbiological Contamination in Biological Product Manufacturing. American. Pharm. Rev. 14(1) 2011: 50-56.
3 Issekutz A. Removal of Gram-Negative Endotoxin from Solutions By Affinity Chromatography. J. Immunol. Met. 61(3) 1983: 275-281.
4 Anspach F. Endotoxin Removal By Affinity Sorbents. J. Biochem. Biophys. 449(1-3)2001: 665-681.
5 Guo W, et al. Removal of Endotoxin from Aqueous By Affinity Membrane. Biomed. Chromatogr. 11(3) 1997: 164-166.
6 Chen H, et al. Factors Affecting Endotoxin Removal from Recombinant Therapeutic Proteins By Anion Exchange Chromatography. Prot. Expr. Purif. 64(1) 2009:76-81.
7. Hirayama C, et al. Cross-linked N,N Dimethylaminopropylacrylamide Spherical Particles for Selective Removal of Endotoxin. J. Chromatogr. A 676(2) 1994: 267-275.
8. Hoess A, Lidington R. Lipopolysaccharide-Binding and Neutralizing Peptides. World Patent WO 1995005393 A2 1993I; www.google.com/patents/WO1995005393A2?cl=en:Method.
9. Kang Y. Endotoxin removal from protein solutions by immobilized metal affinity chromatography, 2000, archives.njitedu/vol01/etd/2000s/2000/njit-etd2000-023/njit-etd2000-023.pdf.
10. Luo R, Kang Y. Methods for endotoxin removal from biological solutions using immobilized meta affinity, U.S. Pat. No. 6,365,147B1, 1999.

The invention claimed is:

1. A method for improved depletion or removal of endotoxins from a known or suspected endotoxin-containing source by virtue of a solid phase extraction material in an essentially aqueous system comprising the steps of
providing a known or suspected endotoxin-containing source solution;
contacting the known or suspected endotoxin-containing source solution with a positively charged solid phase material having a surface on which ferric iron is immobilized, wherein the solid phase material has immobilized the ferric iron by tris(2-aminoethyl)amine (TREN) ligand;
incubating the known or suspected endotoxin-containing source solution for a period of time sufficient to bind endotoxin to the solid phase material and to form an incubated solution; and
separating the solid phase material from the incubating solution to obtain a product solution with reduced endotoxin levels relative to the source solution, wherein the endotoxin levels are lower than endotoxin levels obtained by a process that is equivalent except for using iminodiacetic acid (IDA) chelating ligands.

2. The method of claim 1, wherein the solid-phase extraction is a method selected from the group consisting of chromatography, filtration, co-precipitation and combinations thereof.

3. The method of claim 1, wherein the solid phase material comprises a chromatographic material which depletes or removes the endotoxin by ferric iron chelation from the known or suspected endotoxin-containing source solution.

4. The method of claim 1, wherein the known or suspected endotoxin-containing source solution is selected for the manufacturing of low-endotoxin bacteriophages containing compositions, for the purification of recombinantly produced proteins, for removal of endotoxins and/or viruses from cell culture ingredients to be used in preparation of recombinantly produced proteins, and for removal of endotoxins from in vitro diagnostic assay reagents.

5. The method of claim 1, wherein the method is performed in combination with other purification methods.

6. The method of claim 5, wherein the other purification methods are selected from hydrophobic interaction chromatography, preferential exclusion chromatography and anion exchange chromatography.

7. The method according to claim 1, further comprising isolating the essentially aqueous system freed from or depleted of endotoxin after the separating step.

8. The method of claim 4, wherein the purification of recombinantly produced proteins is for therapeutic applications.

9. The method of claim 1, wherein the incubating is performed at a pH of 7.7±1.0.

10. The method of claim 1, wherein the incubating is performed with a salt concentration up to 100 mM distinct from the buffer.

11. The method of claim 1, wherein the incubating is performed with buffers comprising 1% to 50% glycerol.

12. The method of claim 1, wherein the incubating is performed at a pH of 7.7±1.0, with a salt concentration from 20 mM to 100 mM, with buffers comprising 1% to 50% glycerol.

13. The method of claim 1, wherein the endotoxin levels are at least 14 times lower than endotoxin levels obtained by a process that is equivalent except for using IDA chelating-ligands.

14. The method of claim 1, wherein the solid phase material has a charge of at least +3 per ligand.

15. The method of claim 1, wherein the product solution has an endotoxin concentration of less than 1 EU per $10^9$ infective bacteriophage particles.

* * * * *